United States Patent [19]

Inoue

[11] Patent Number: 4,896,988
[45] Date of Patent: Jan. 30, 1990

[54] WATERPROOF DEVICE FOR JOINT SECTION

[75] Inventor: Yoichi Inoue, Kiryu, Japan

[73] Assignee: Mitsuba Electric Manufacturing Co., Ltd., Gunma, Japan

[21] Appl. No.: 292,779

[22] Filed: Jan. 3, 1989

[30] Foreign Application Priority Data

Jan. 11, 1988 [JP] Japan .............................. 63-2330[U]

[51] Int. Cl.4 ............................................. F16C 11/06
[52] U.S. Cl. .................................... 403/134; 403/288; 403/50; 277/212 FB
[58] Field of Search .................. 403/134, 135, 50, 51, 403/288; 277/212 FB

[56] References Cited

U.S. PATENT DOCUMENTS

| | | | |
|---|---|---|---|
| 3,511,061 | 5/1970 | Burkhart | 277/212 FB |
| 4,143,983 | 3/1979 | McEowen | 403/138 |
| 4,278,262 | 7/1981 | Mizutani et al. | 277/212 FB |
| 4,537,524 | 8/1985 | Hanson | 403/135 |
| 4,681,475 | 7/1987 | Kanegawa | 403/135 |
| 4,755,078 | 7/1988 | Blumberg et al. | 403/50 |

*Primary Examiner*—Randolph A. Reese
*Assistant Examiner*—Carol I. Bordas
*Attorney, Agent, or Firm*—Rodman & Rodman

[57] ABSTRACT

The waterproof device includes an elastic seal member for covering a joint section rotatably connecting a pair of rods. On both ends of the seal member are provided covering sections for waterproofing the sides of both rods, between which covering sections are located a displacement offsetting section. This displacement offsetting section includes thick and thin strips formed toward both ends in a manner to alternately locate thick and thin strips. The strips are formed on the peripheral surface of the displacement offsetting section at regular intervals.

3 Claims, 2 Drawing Sheets

WATERPROOF DEVICE FOR JOINT SECTION

BACKGROUND OF THE INVENTION

1. Field of the Invention

The present invention relates to a waterproof device for a joint section, and more particularly to the waterproof device for a joint section which permits relative swinging between a pair of connected rods. It is effective to apply the present invention, for example, for waterproofing a joint section provided between a crank arm and a rod in a wiper device installed in a vehicle.

2. Related Art Statement

A typical wiper device for wiping a front glass of a car comprises a crank arm rotated by a motor, a connecting rod (hereinafter, referred to as a rod) for converting the rotation of the crank arm into reciprocative movement in a manner to reciprocate a linkage connected to a wiper arm, and a joint section, provided between the crank arm and the rod, which permits relative swinging between them.

In this type of wiper device, a waterproof device is mounted at the joint section between the crank arm and the rod as shown in FIG. 5. This waterproof device includes a seal member 7 integrally formed of an elastic material such as rubber. The seal member 7 is mounted to cover the joint section for waterproofing it. That is, one end 9 of the seal member 7 is fitted on the rod side of the joint section and the other end 8 thereof is slidably fitted on the crank arm end thereof.

Yet, this type of waterproof means for a joint section produces a partial gap between the seal member and the rod when thhe rod swings as shown in FIG. 5, because the seal member is slidably fitted on the crank arm end. It thus cannot serve as complete sealing.

SUMMARY OF THE INVENTION

It is an object of this invention to provide a waterproof device for joint section which allows for reliable waterproofing for the joint section that pivotally connects a pair of rods.

The waterproof device for joint section according to the present invention is characterized by covering both rod sides of the joint section with a pair of covering sections of a seal member formed of an elastic material, providing a displacement offsetting section between both covering sections, and forming on the displacement offsetting section a plurality of thick or thin portions extending toward both ends of the displacement offsetting section, which thick or thin portions are alternately located in the circumferential direction of the displacement offsetting section.

According to the above-described waterproof device for joint section of the present invention, the sealed state of both covering sections are properly kept because the displacement offsetting section of the seal member is transformed according to the relative swinging movement of both rods, thus absorbing the relative displacement of both covering sections. The displacement offsetting section allows the overall end areas of both covering sections to be reliably pressed onto both rods without producing any partial gap and thus keeps the sealing integrity, because the thick or thin portions serve to prevent the transmission in the circumferential direction of deformation of the displacement offsetting section and reinforce elastic force applied to both ends.

BRIEF DESCRIPTION OF THE DRAWINGS

The above and other objects and features of the present invention will become more apparent when referred to the following descriptions give in conjunction with the accompanying drawings, wherein like reference numerals denote like elements, and in which.

DETAILED DESCRIPTION OF THE PREFERRED EMBODIMENTS

Figure 1:
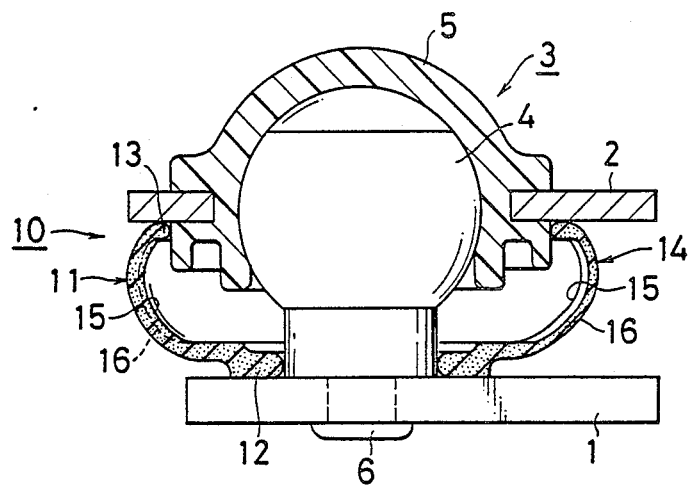
FIG. 1 is a sectional elevation showing a joint section provided in a wiper device in which one embodiment of a joint waterproof device according the present invention is employed.

Referring to the drawings, FIGS. 1 to 4 describe one embodiment of a waterproof device for joint section according to the present invention, which is employed for a joint section in a wiper device provided in a vehicle such as a car or the like. It has construction for reliably waterproofing a joint section provided between a crank arm 1 and a rod 2. One end of the connecting rod 2 is rotatably fitted through a joint section 3 to the free end of the crank arm 1 served as the other rod, which is rotated interlockingly with a shaft of a wiper driving device (not shown). The other end of the rod 2 (not shown) is rotatably connected to a free end of a linkage. One end of the linkage is secured on a shaft rotatably supported at a lower portion of a car window frame. On this shaft, a wiper arm holding a wiper glade at its free end is supported in a manner to rotate interlockingly with the linkage.

The joint section 3 provided between the crank arm 1 and the rod 2 includes a spherical shaft 4 and a spherical bearing member 5. The bearing member 5 is fitted to the spherical shaft 4 in a manner to be able to rotate in the three dimensional direction. The spherical shaft 4 is located at essentially right angles with one end of the crank arm 1 and is secured by a suitable means such as a rivet 6 clinched. The spherical bearing 5 is formed of synthetic resin. The form is like an inverted bowl. It is located and integrally formed by outsert molding technique at one end of the rod 2. The shaft 4 is fitted to the bearing member 5 availing of the elasticity of the resinous bearing member 5, thus, the spherical shaft bearing member 5 supports the spherical shaft 4 in rocking contact.

The waterproof device 10 for joint section according to this embodiment includes a seal member 11 integrally formed of an elastic material such as rubber. The construction shown in FIGS. 3 and 4 denotes the seal member 11 dismounted from the joint section 3. The seal member 11 covers the joint section 3 between the crank arm 1 and the rod 2. The seal member 11 provides a crank arm side covering section 12, a rod side covering section 13, and a displacement offsetting section 14 formed therebetween. The crank arm side covering section 12 is formed to be a substantially circular ring having the essentially same inner diameter as the column base end of the spherical shaft 4. The covering section 12 is idly fitted around the spherical shaft 4 before it fits into the spherical bearing member 5. The rod side covering section 13 has a form of a ring being circular in section. Hence, the covering section 13 smoothly fits into the crank arm side circular ring section when the spherical shaft 4 is fitted to the spherical bearing member 5.

The displacement offsetting section 14 is formed like a bellow. Since the section 14 is mounted to the joint section 3 in a manner to be contracted to some extent, thus giving elastic force to press both opening ends of the crank arm side covering section 12 and the rod side covering section 13 toward respective rods in a normal state. On the inner peripheral surface of the displacement offsetting section 14 are integrally formed a plurality of strips of thick portios 15 (12 strips are shown in this embodiment), which are circumferentially located at regular intervals and extend toward the covering sections 12 and 13 located at both ends of the section 14. That is, each strip of thick portion 15 extend in essentially parallel to the axis of the spherical shaft 4 on the peripheral inner surface of the section 14. Since thick portion is formed essentially in arc form in horizontal section, the section 14 can apply stronger pressure to the crank arm side covering section 12 and the rod side covering section 13. A strip of thin portion 16 is located between the adjacent thick portions 15, 15 on the inner peripheral surface of the displacement offsetting section 14 and extends in parallel in axial direction.

Next, the operation of this embodiment will be described.

When the wiper device is wiping the front glass, the crank arm 1 rotates and the rod 2 reciprocates relative to the crank arm 1. Hence, the spherical bearing member 5 relatively rotates against the spherical shaft 4.

The seal member 11 allows the spherical bearing member 5 to rotate, because the rod side covering sectin 13 and the crank arm side covering section 12 respectively fit into the spherical bearing member 5 and the spherical shaft 4 in the non-fixed state. At that time, the crank arm side covering section 12 and the rod side covering section 13 are relatively slid as reliably keeping themselves close to the crank arm 1, because they are strongly pressed on the crank arm 1 and the rod 2 by strips of thick portiosn 15 formed on the displacement offsetting section 14. The seal member 11, therefore, can keep the sealing state with reliance.

Figure 2:
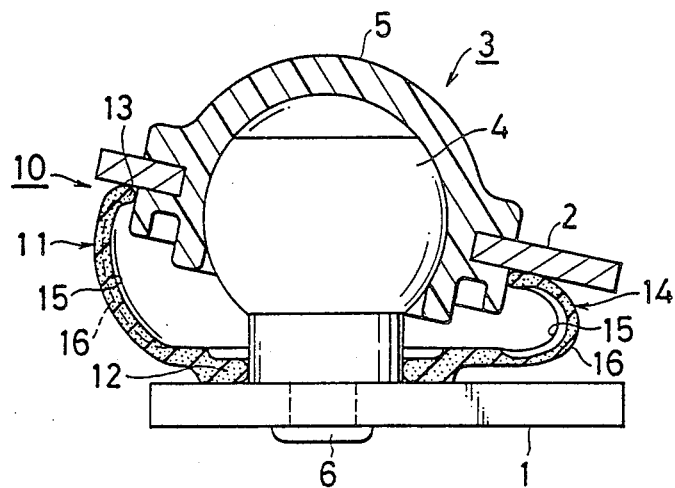
FIG. 2 is a sectional elevation for describing the operation of the waterproof device of FIG. 1.
Figure 3:
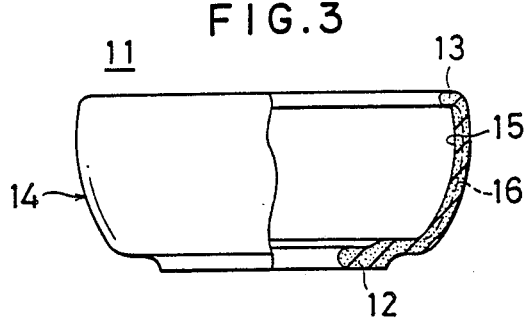
FIG. 3 is a partial cutaway elevation showing a seal member employed in the waterproof device of FIG. 1.
Figure 4:
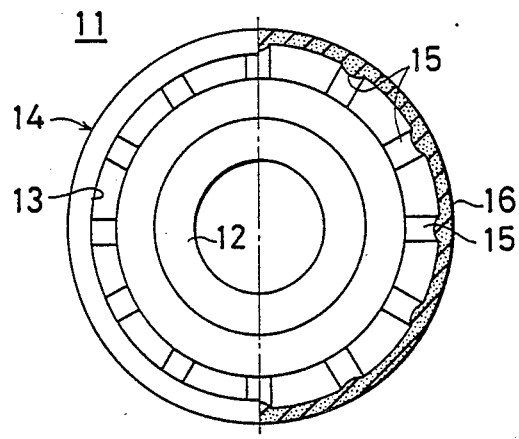
FIG. 4 is a partial cutaway plane view of the seal member of FIG. 3.
Figure 5:
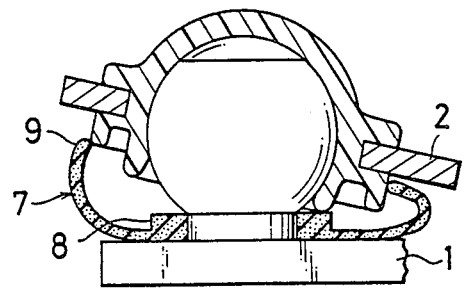
FIG. 5 is a partial cutaway plane view showing a prior art.

As shown in FIG. 2, when the crank arm 1 and the rod 2 relatively swing, the spherical bearing member 5 having the rod side covering section 13 fitted onto it is inclined against the axis of the shaft 14. It may produce a gap on the contact between the rod side covering section 13 and the rod 2. That is, as shown in FIG. 2, when one side of the space defined by the crank arm 1 and the rod 2 (the right side shown in FIG. 2) is made narrower, the corresponding portion of the seal member is contracted. Further, the corresponding portion of the seal member at the opposite side (the left side shown in FIG. 2) may also be contracted if a part of the seal member 11 is largely affected by a deformation of another part of the seal member 11. As shown in FIG. 2, the space at the opposite side is made wider, therefore, when the corresponding portion of the seal member 11 is contracted, the rod side covering section 13 tends to slip off the spherical bearing member and produce a gap (see FIG. 5).

This embodiment, however, provides the displacement offsetting section 14 between both covering sections 12 and 13 of the seal member 11. Further, the displacement offsetting section 14 includes thick or thin portions 15 alternately formed thereon and extending vertically. It therefore reduces deformation of the seal member 11 induced by deformation of a horizontal neighboring portion, keeping a sufficient vertical elastic force, so that the left portion of the seal memeber 11 is not contracted as a result of the contraction applied on the right portion as shown in FIG. 2. That is, the rod side covering section 13 of the seal member 11 can be reliably pressed on the overall contact surface of the rod 2. In this case, therefore, this seal member can reliably keep sealing as well.

It goes without saying that this invention is not limited to the foregoing embodiment and various changes and modifications can be made to the invention within the scope of it.

For example, it is preferable to select the form and structure of the crank arm side or rod side covering section according to the from and structure of the joint section without being limited to the foregoing embodiment.

The displacement offsetting section may be constructed in any form which offsets relative displacement of both covering sections, for example, like a bellow, without being limited to a bellow form.

It is also possible to form the convex or concave portions composed of thick or thin strips on the outer peripheral surface of the displacement offsetting portion without forming them on the inner peripheral surface thereof.

Further, it is possible to locate thick or thin strips at small intervals like a knurled groove without being limited to locating them at large regular intervals.

The foregoing embodiment describes the waterproof device for a joint section in a wiper device provided in a vehicle, but, without being limited to this, the waterproof device of this invention can be applied to all the joint section rotatably connecting a pair of rods.

As set forth above, this invention makes it possible to reliably waterproof the joint section rotatably connecting a pair of rods. It therefore offers high endurance to the joint section.

What is claimed is:

1. A waterproof device for a joint section rotatably connecting a pair of rods comprising, a seal member formed of an elastic material, said seal member having opposite ends, covering sections provided at both said opposite ends of said seal member to respectively cover the rods provided at both said opposite ends of said seal member, a displacement offsetting section provided between both said covering sections, and a plurality of strips of thin and thick portions formed on said displacement offsetting section in a manner to locate said thick or thin strips alternately and extend toward both said ends of said seal member, said joint section including a spherical shaft having an axis and wherein said thick and thin portions extend in essentially parallel relationship to said axis.

2. The device according to claim 1 wherein said thick portions are formed on the peripheral surface of said displacement offsetting section at regular intervals.

3. The device according to claim 1 wherein said joint section comprises: said spherical shaft connected to one of said pair of rods and having a spherical surface at least on a part of the outer surface thereof; and a spherical bearing member having a spherical concavity with the substantially same curvature radius as the spherical surface of the spherical shaft and receiving said spherical surface of said spherical shaft in a manner to allow said spherical bearing member to rotate in the three-dimensional direction, and said covering sections fitted on both ends of said seal member are respectively mounted on the sides of the spherical shaft and the spherical bearing member in a manner to allow the spherical shaft and the spherical bearing member to be waterproofed.

* * * * *